United States Patent [19]

Nanz et al.

[11] Patent Number: 4,653,725
[45] Date of Patent: Mar. 31, 1987

[54] BUTTERFLY VALVE

[76] Inventors: Dieter Nanz, Tailfinger Strasse 10 a, D-7000 Stuttgart-Moehringen; Wolfgang Doersam, Heilbronner Strasse 14, D-7518 Bretten, both of Fed. Rep. of Germany

[21] Appl. No.: 572,111

[22] Filed: Jan. 19, 1984

[30] Foreign Application Priority Data

Jan. 22, 1983 [DE] Fed. Rep. of Germany ....... 3302159

[51] Int. Cl.$^4$ .............................................. F16K 1/22
[52] U.S. Cl. .................................... 251/306; 251/148; 251/367; 285/336; 285/367
[58] Field of Search ............... 251/305, 306, 308, 367, 251/99, 148; 285/336, 367, 411

[56] References Cited

U.S. PATENT DOCUMENTS

| | | | |
|---|---|---|---|
| 2,065,750 | 12/1936 | Safford | 251/99 |
| 2,674,471 | 4/1954 | Hawkins | 285/411 |
| 3,110,471 | 11/1963 | Kuhles | 251/367 |
| 4,060,220 | 11/1977 | Fischer | 251/306 |
| 4,093,178 | 6/1978 | Hughes et al. | 251/305 |
| 4,111,395 | 9/1978 | Sheppard | 251/367 |
| 4,332,271 | 6/1982 | Rohr | 251/305 |

FOREIGN PATENT DOCUMENTS

| | | |
|---|---|---|
| 2536995 | 8/1975 | Fed. Rep. of Germany . |
| 7617567 | 11/1977 | Fed. Rep. of Germany . |
| 2819921 | 4/1978 | Fed. Rep. of Germany . |
| 7916836 | 6/1979 | Fed. Rep. of Germany . |
| 2810683 | 9/1979 | Fed. Rep. of Germany . |
| 8016402 | 7/1980 | France . |

Primary Examiner—Martin P. Schwadron
Assistant Examiner—Sheri M. Novack
Attorney, Agent, or Firm—Steele, Gould & Fried

[57] ABSTRACT

A butterfly valve has a housing formed from two stamped sheet parts. The shaft of the valve flap is located in shaped-out parts of the housing halves. The two flanges of the housing halves are held together by a clamp, which has an inwardly open, U or V-shaped cross-section and can be secured in articulated manner by two semicircular parts and presses by chamfered inner faces on tori on the flanges. Thus, the valve can be assembled and disassembled by loosening a single screw.

15 Claims, 5 Drawing Figures

BUTTERFLY VALVE

BACKGROUND OF THE INVENTION

The present invention relates to a butterfly valve with a housing, a flow channel passing through the housing and a disk-shaped valve flap swivellable by a rotatably-mounted shaft closing the flow channel, the housing being subdivided into two parts along a separation plane at right angles to the flow channel having in each case an outwardly projecting flange, having a surface directed towards the separation plane and an outer surface directed away therefrom, recesses being provided in the vicinity of the separation plane for a seal surrounding the flow channel and the shaft.

A butterfly valve of this type is described in U.S. Pat. No. 4,060,220. The construction of its housing from stamped sheet parts, i.e. sheet metal halves machine formed by other than chip-producing processes with only slight chip-forming remachining, permits manufacture in material and labour-saving manner. The two housing halves, between which are guided and fixed in recesses the flap shaft and the seal sealing the housing halves against one another and also the flap shaft and the valve flap, have outwardly projecting flanges which are fastened together by a plurality of bolts. The provision of bolts requires a relatively large flange diameter, so that the screws are accessible for assembly and disassembly. To prevent deformations of the flange housing, it is necessary to provide numerous screws on the circumference, particularly if the housing is thin, which may be done for constructional reasons.

German Utility Model No. 7,916,836 discloses a butterfly valve, whose housing comprises two solid halves made from cast material or produced by chip-forming machining, whose separation plane passes through the rotational symmetry axis of the connection piece forming the flow channel. The sealing ring is supported on projections of the connection piece and on the housing. The housing also guides the flap shaft and is pressed together on either side by screws. This valve construction is very advantageous when manufactured from easily cast or chip-machined materials, such as e.g. aluminium, but involves very high material and labour costs in the case of materials such as stainless steel. Machining must also take place very precisely, because the two housing parts are engaged in the separation plane and determine the compression of the seal both directly and indirectly by the pressing together of the two connection pieces via sloping surfaces.

In addition, Offenlungungsschrift No. 2,810,683 discloses a butterfly valve of the aforementioned type, onto whose housing flanges is shaped an actuating lever stop flange surrounding the flap shaft. However, this solution requires complicated tools due to the considerable deformation in this flange area.

Offenlungungsschrift No. 2,819,921 also discloses a flange connection in which two solid, axially elongated rings with in each case two sets of inner inclined planes, with in each case two conical inclined planes cooperate on two oppositely directed connection pieces and consequently secure a sealing member between them. The two halves of the clamping parts are interconnected by pinning.

SUMMARY OF THE INVENTION

The object of the invention is to further improve a butterfly valve in the sense of improved housing stability and easy assembly.

This problem is solved in that a clamp subdivided into at least two parts is provided having substantially U or V-shaped cross-sections and chamfered inner surfaces, which surround and overlap the flanges, accompanied by clamping means acting between the parts of the clamp and circumferentially securing the same, with in each case at least one torus, positioned in the vicinity of the outer circumference of the flanges, passing in the circumferential direction of the flanges, projecting axially over the outer faces of the flanges and cooperating with the inner faces of the clamp for securing the flanges when operating the clamping means.

Thus, the invention economizes on the numerous bolts necessary for securing the flanges. As a result, it is possible to construct the housing flanges with a much smaller diameter and which can in fact be smaller than the circle on which the fastening bolts are located. This counteracts the tendency of the flanges to bulge out under internal pressure. In addition, the tori reinforce the flange and also ensure a clearly defined contact line. Consequently, there is no need for matching inclined planes and it is possible to better define the position of the contact pressure point through the position of the torus. In addition, the clamp can be fitted and detached much more quickly, because normally only one screw is required for this. Thus, a seal can be replaced extremely rapidly. The clamp can comprise two substantially semicircular, profiled sheet metal parts, so that the material consumption is very low. The tori can be annular reinforcing seams chipless-machined from the sheet metal material.

The clamp parts are preferably interconnected in hinge-like manner also by interengaging projections. Thus, interengaging hooks can be provided on two adjacent ends of the clamp parts, which are hung into one another and consequently form a hinge without additional parts or bolts. The fixing of the clamp can take place by means of a locking screw, whose one part is fitted in articulated manner to one of the clamp parts. Thus, the thread can be located in a joint bolt, so that the locking screw is undetachably fitted to a clamp part. It can advantageously be inserted in a fork-like slot of a clamp part. Thus, the locking screw can be swivelled out of engagement with the clamp part and it is not necessary to completely undo the screw for opening the clamp.

According to a particularly preferred embodiment, the clamp can carry the actuating mechanism for the valve flap shaft, e.g. the locking mechanism of an actuating lever or a pneumatic, electric or hydraulic motor and/or forms the position securing means for the same. It can be fitted and removed together with the clamp, which greatly facilitates repairs and cleaning.

The clamp can have an optionally shaped collar surrounding the flap shaft, which on the one hand covers said shaft in this area and can constitute a support for the actuating mechanism and further functional parts, and on the other hand additionally reinforces the clamp in said area in which the outer ring of the clamp, i.e. the base of the U or V is broken through, whereas otherwise only the lateral legs would have a supporting effect.

Advantageously, onto the collar can be shaped an inwardly directed flange, which forms a termination of the collar and can also be used for engaging in a slot on the shaft and axially secures the same.

It is possible to fit, e.g. by spot welding to one end of the collar, a locking disk with notches for an actuating lever connected in non-rotary manner with the flap shaft. Thus, this usually segmental locking disk with upturned edge and locking recesses provided therein is consequently fitted to the clamp and not to the housing and can be removed together with the former.

In one construction, in which the actuating lever can be swivelled about a shaft at right angles to the flap shaft under spring loading, the lever preferably projects through a preferably plastic spring support fitted to the flap shaft and containing the spring, said spring support supporting the springs and the actuating lever loaded by them in the axial direction of the flap shaft. This serves to make it possible to swivel the actuating lever for disengagement from the locking disk. The spring support, which supports the springs and the actuating lever, ensures that the springs do not axially load the flap shaft, which could lead to a one-sided displacement of the loading conditions between the disk-like valve flap and the seal. This also makes it possible to join, preferably by injection moulding, a many-sided coupling part to the spring support and which transfers the rotary movement of the actuating lever to the flap shaft. The actuating lever which, due to its being swivelable, can only transfer the torque with its two longitudinal faces, consequently acquires a broader transfer base for the torques, whilst the coupling part, e.g. with a square end has a larger transfer surface. In addition, the outer edges of the actuating lever can be guided on these spring supports for transferring torques. This additionally ensures reliable, wear-free force transfer. Further features of the invention can be gathered from the following description relative to the drawing, it being possible to realise the individual features individually or in various subcombinations within the scope of an embodiment according to the invention.

BRIEF DESCRIPTION OF THE DRAWINGS

The invention is described hereinafter relative to a non-limitative embodiment and the attached drawings, wherein.

DETAILED DESCRIPTION OF THE INVENTION

Figures 1, 2:
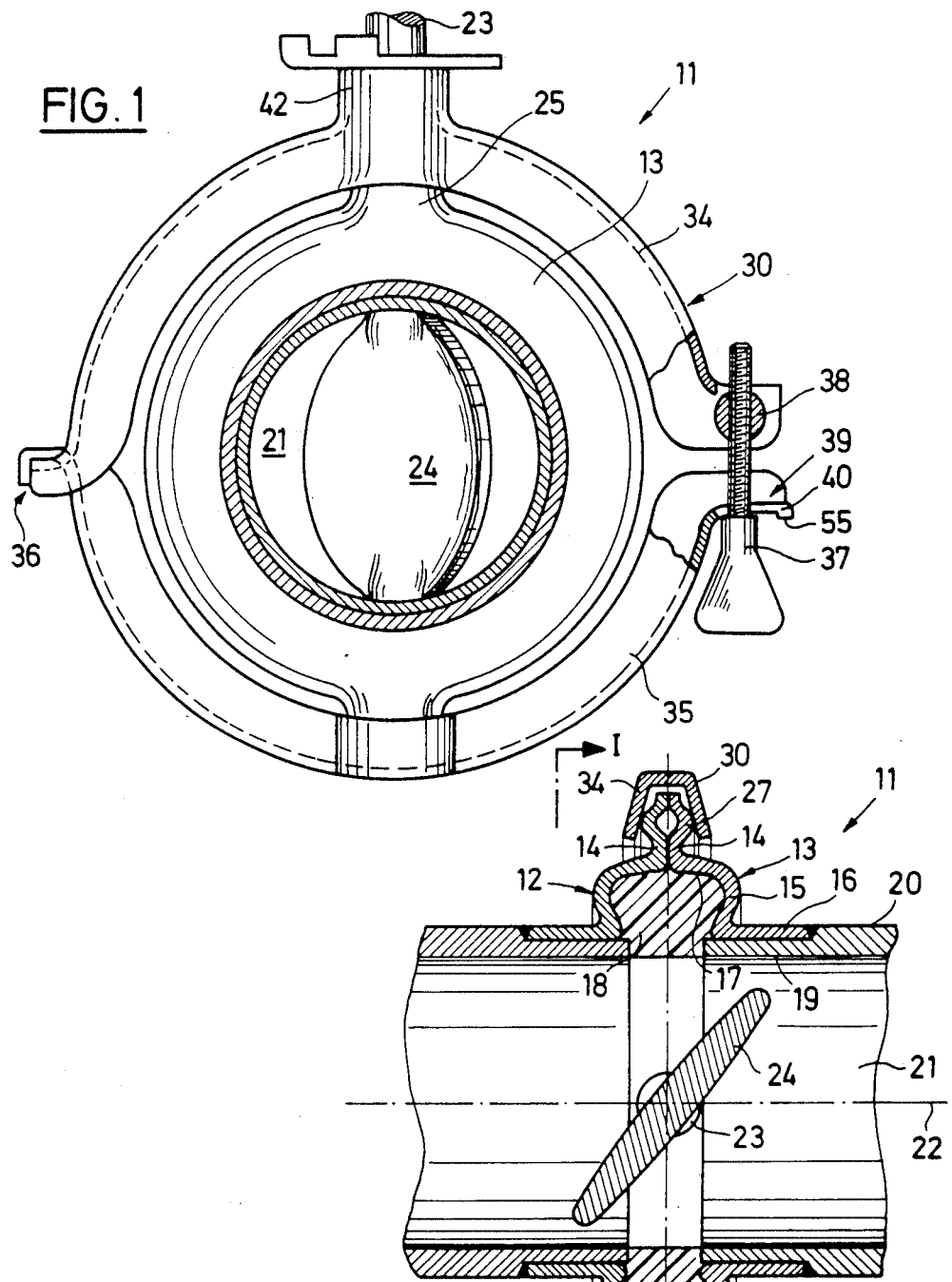
FIG. 1 is a section through a butterfly valve along line I of FIG. 2.
FIG. 2 is a partial section through the valve.

The represented butterfly valve 11 has a housing formed from two identical housing halves 12, 13 in the form of homologous, oppositely directed stamped sheet parts. Each housing half has a radially directed flange 14, a toroidal transition part 15 and a connection piece 16 having a ring or pipe section shape. The transition part 15 is shaped in such a way that an annular recess 17 is defined between the two housing halves and receives a sealing ring 18. The recess is undercut (roughly omega-shaped), so that the seal matched thereto is inwardly secured against sliding out. This is helped further in the represented embodiment by a recessed, socket-like inner area of a connection piece 20 on each side and to which is welded the connection piece 16 of the housing half. However, it is also possible to make do without this inner projection 19 of the connection piece 20. In this case, connection piece 16 would directly abut with the tubular flow channel 21. The connection piece 20 can be a pipe or the socket of a connecting flange, depending on whether a direct welding of the valve into the pipe is desired, or whether fixing by flanging is to take place.

A throttle flap-like valve flap 24 projects through the flow channel at right angles to the longitudinal axis 22 of channel 21. By means of the flow channel, a valve flap, usually constructed as a circular flat lens-like disk, is moved between an open position in axial direction 22 and a closed position in which valve flap 24 closes flow channel 21 and engages by its outer circumference on the internal diameter of sealing ring 18.

The circular flap shaft 23 projects through two approximately semicircular openings 25 in the housing halves and on assembling the latter gives a circular guide for the flap shaft. It also projects through the sealing ring, so that the latter has the triple function of sealing the valve flap, the two housing halves and the flap shaft.

Flanges 14 have a relatively small external diameter and preferably relatively close to the outer circumference thereof have outwardly directed tori 27, i.e. away from the separation plane 26 between the two housing halves 12, 13, said tori being stamped outwards from the flange material and passing round the flange circumference, with the exception of the areas of openings 25.

Figure 3:
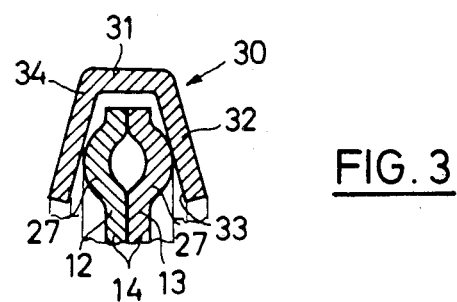
FIG. 3 is a larger-scale detail through an edge of the flange and a clamp.

A clamp 30 is provided for pressing the two flanges firmly against one another. It has the U or V-shaped cross-section shown in FIG. 3 and comprises a base forming an outer ring 31 and inwardly widening side plates 32 which, on the inner face thereof, form chamfered contact surfaces 33. The circular clamp is formed from two clamped parts 34, 35, which are shaped from sheet metal with the described cross-section and have at one end of the semicircular extension thereof interengaging projections 36, which are bent outwards in hooklike manner and whereof one has an opening and another a corresponding nose, so that they can be hooked into one another in hinge-like manner. At openings 25, the side plates can be curved outwards. At the other end of each clamping part and reinforced by the side plates, it is also bent outwards. Between the side plates of the clamping part 34, a bolt 38 is pivotably fitted in this area and has a taphole at right angles to its pivot axis and into which the locking screw 37 is screwed. The outwardly directed projection 39 has an outwardly open slot 40, through which the screw can be swivelled in and out. The screw head in the form of a winged head is supported on projection 39 and is secured by an upturned end portion 55.

It is clear that for securing together the two housing halves 12, 13, it is merely necessary to bring into position the two clamp halves by means of flanges 14, followed by the pivoting into slot 40 of the locking screw 37 undetachably fitted to clamp part 34, followed by tightening. The chamfered contact surfaces 33 of the clamp presses onto tori 27 and consequently presses the housing halves against one another with considerable force, in accordance with the slope of contact surfaces 33. It has been found that this clamping connection is certainly equal to a screw connection with several bolts and which would require a much larger flange diameter.

Figure 4:
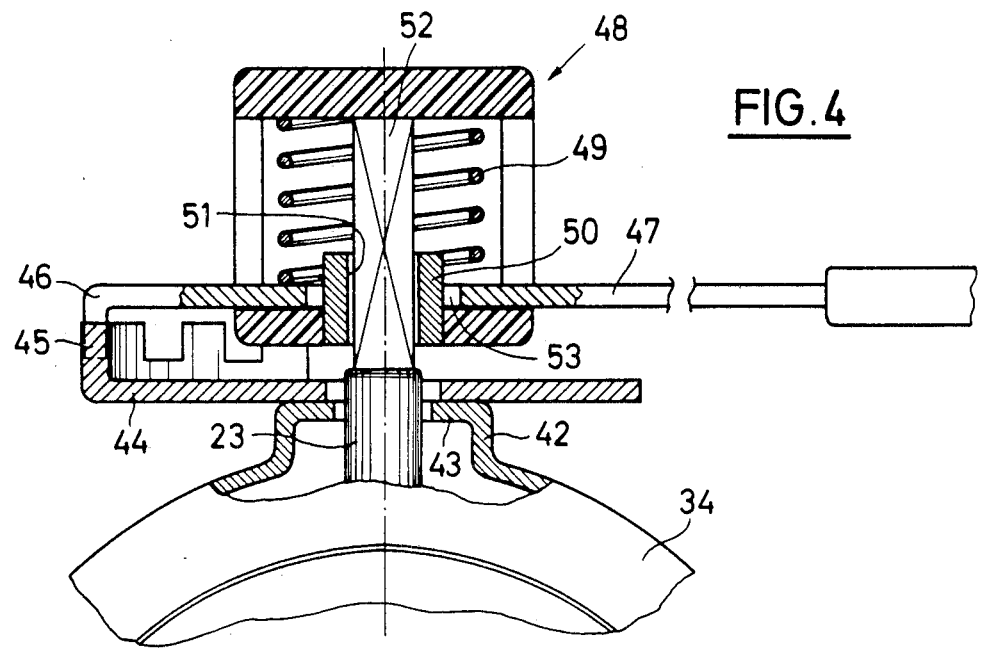
FIG. 4 is a larger-scale detail along line IV in FIG. 2.

FIG. 4 more particularly shows the area around the outlet of the drive end of flap shaft 23 from the housing.

In this area, an outwardly directed shoulder 42 with an inwardly directed flange 43 is shaped from the material of clamp 30 and surrounds the flap shaft 37. A cam 44 in the form of a 90° circular segment is fixed by spot welding to flange 43 and in the vicinity of its arcuate surface and the sides connected thereto has upwardly directed side parts 45, in which locking recesses are provided. In the latter engage a nose 46 on the end of an actuating lever 47 for the valve. The actuating lever projects through the injection moulded plastic spring support 48, which is fixed to the upper end of flap shaft 23. Its sleeve-like body surrounds a compression spring 49, which is supported at the top on the spring support and at the bottom of the actuating lever 47, so that it presses the latter into a lower, horizontal position, in which the nose 46 engages in a notch of the locking disk. A coupling part 50 is joined by injection moulding to the spring support, is made from metal and internally and externally has a square shape. Its internal square 51 is mounted on a corresponding square 52 of the flap shaft, so that the coupling part and the spring support are connected in non-rotatable manner with flap shaft 23. Actuating lever 47 has a slot 53 which, in order to permit a pivoting of the actuating lever, is somewhat longer than the external square of coupling part 50 to which lead the lateral definitions of the slot and transfers the actuating lever torque to the coupling part. For disengaging nose 46, the grip end of the actuating lever is forced downwards and then swivels counter to the tension of spring 49, but remains in rotary engagement with the flap shaft. Surfaces of the spring support 48 running parallel to the longitudinal extension of actuating lever 37 can be constructed in such a way that they guide the outer edges of actuating lever 37 between them and consequently contribute to the torque transfer.

An important advantage of the invention is that the housing is considerably reinforced in the outer area, i.e. on the outer edges of the flanges, where not only are the tori 27 present, but also the sheet metal and the side plates 32 are quadrupled and the outer ring 31 of the clamp acts as a reinforcing flange. It is particularly advantageous that the clamp parts 34, 35 are not fully superimposed in the vicinity of the locking screw in the tightened state and can consequently be randomly retightened with limited force.

Figure 5:
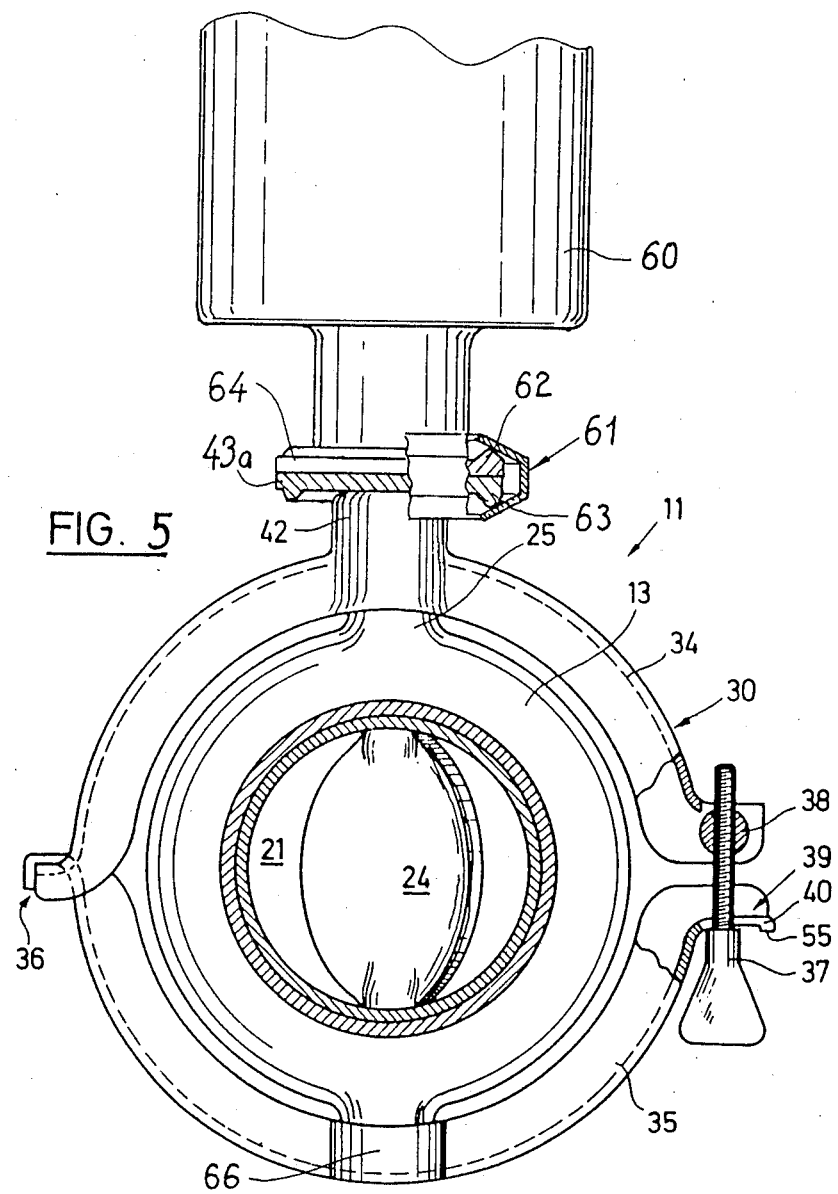
FIG. 5 is a section corresponding to FIG. 1 through the valve with a pneumatic actuating means.

Whilst FIGS. 1 to 4 show a manually operable construction with a fixing means for the actuating lever 47, namely fixing notches on the shoulder 42, FIG. 5 shows a pneumatically operated construction. It contains a pneumatic actuating mechanism 60, i.e. a per se known pneumatic cylinder where, under the action of compressed air, a piston is axially displaced and by means of a helical guide the output shaft is rotated and rotates the valve shaft (cf U.S. Pat. Nos. 3,602,478 and 4,325,535).

In a construction which is otherwise identical with FIG. 1, a circular disk is welded to the upper face of the shoulder and forms a protruding flange 43a. On its face directed towards valve 11, it has a torus 63 round the edge area. A flange 64 with a torus 62 is provided in homologous manner on actuating mechanism 60. They are secured by a clamp 61 which can be the same as clamp 30 other than for the limited size and the lack of shoulder 42, as well as the part 66 facing the same for the lower shaft guide. Thus, as required, either the complete clamp 30/actuating mechanism 60 unit or the actuating mechanism alone can be removed by merely operating a screw and without any tool, fitting being possible in the same way. This is particularly advantageous in the case of valves which have to be frequently cleaned and checked. In the same way as flanges 43a, 64, flanges 12, 13 can be made from more solid material, e.g. by turning and the tori 27 can be produced in chip-forming manner, although manufacture of the relatively large housing halves from stamped sheet parts permits considerable material and labour savings. Flange 43a could also be constructed as an outwardly bent-over end of shoulder 42 in one piece with the clamp part 34.

What is claimed is:

1. A butterfly valve comprising:
a housing, a flow channel passing through the housing and a disk-shaped valve flap swivelable by a rotatably mounted shaft closing the flow channel, the housing having openings for rotatably mounting the shaft, the housing being subdivided into two parts along a separation plane at right angles to the flow channel, the two parts having in each case an outwardly projecting flange, the flange having a surface directed towards the separation plane and an outer surface directed away from the separation plane, recesses being provided adjacent the separation plane for a seal surrounding the flow channel and the shaft, the valve having a detachable clamp subdivided into at least two circumferential parts having shaped cross-sections for surrounding the flanges and said cross-sections being chamfered by inner contact-surfaces of the two circumferential parts defining a slope angle at which the two circumferential parts overlap and contact the flanges at contact lines, whereby radial pressure of the clamp causes opposing axial pressure on the flange of each of said two parts, the clamp having openings adapted for the rotatably mounted shaft, tightening means for urging together the two circumferential parts of the clamp and circumferentially securing the same, at least one torus on each flange being positioned adjacent the outer circumference of the flanges, and having openings adapted to bear the rotatably mounted shaft, projecting axially over the outer surfaces of the flanges and cooperating with the inner contact-surfaces of the clamp for adjustably securing and retightening the flanges to one another when operating the tightening means and circumferentially tightening the same.

2. A butterfly valve according to claim 1, wherein the outwardly-projecting flanges are shaped sheet metal parts and the tori of the flanges are circular reinforcing seams formed in the sheet metal material.

3. A butterfly valve according to claim 1, wherein the clamp is of substantially U-shaped cross-section and comprises two substantially semicircular, profiled, shaped sheet metal parts.

4. A butterfly valve according to claim 1, wherein the two circumferential parts of the clamp are interconnected in hinge-like manner on one end by hook-like interengaging projections.

5. A butterfly valve according to claim 1, wherein the tightening means for securing the two circumferential parts of the clamp include a locking screw, one end of which is threaded into a pivot, the pivot being articulated to one of the two circumferential parts of the clamp.

6. A butterfly valve according to claim 5, wherein the locking screw is insertable into a slot of the other of said two circumferential parts of the clamp, said other part having an upturned portion for securing the locking screw.

7. A butterfly valve according to claim 1, wherein means are shaped on the clamp and thereby provided for fixing an actuating means for the valve flap shaft.

8. A butterfly valve according to claim 7, wherein the fixing means of the clamp contain a collar surrounding the flap shaft, the collar being shaped into the sheet metal material of the clamp.

9. A butterfly valve according to claim 8, wherein an inwardly directed flange is shaped onto the collar.

10. A butterfly valve according to claim 8, wherein the fixing means shaped onto the collar of the clamp include a locking disk with notches for an actuating lever connected in non-rotatable manner with respect to the flap shaft.

11. A butterfly valve according to claim 10, wherein the actuating lever is pivotable under spring loading about an axis oriented at right angles to the flap shaft, the lever projecting through a spring support fitted to the flap shaft and the spring support containing a spring, the spring and the actuating lever being supported on the spring support in an axial direction with respect to the flap shaft.

12. A butterfly valve according to claim 11, wherein a coupling part having a plurality of flat sides is connected to the spring support and transfers the rotary movement of the actuating lever to the flap shaft.

13. A butterfly valve according to claim 11, wherein outer edges of the actuating lever are guided on the spring support for transferring torque.

14. A butterfly valve according to claim 7, wherein the actuating means fixed to the detachable clamp contains a motor operable for pivoting the flap shaft.

15. A butterfly valve according to claim 8, wherein the fixing means of the clamp have an outwardly directed flange positioned on the collar and to which the actuating means can be fitted by means of a further clamp.

* * * * *